Oct. 11, 1932.     F. P. PERKINS     1,881,961
LOADER FOR BOTTLE CLEANING MACHINERY
Filed June 13, 1930     9 Sheets-Sheet 1

Inventor
Frank P. Perkins
By
Attorneys

Oct. 11, 1932.  F. P. PERKINS  1,881,961
LOADER FOR BOTTLE CLEANING MACHINERY
Filed June 13, 1930  9 Sheets-Sheet 3

Inventor
Frank P. Perkins
By
Attorneys

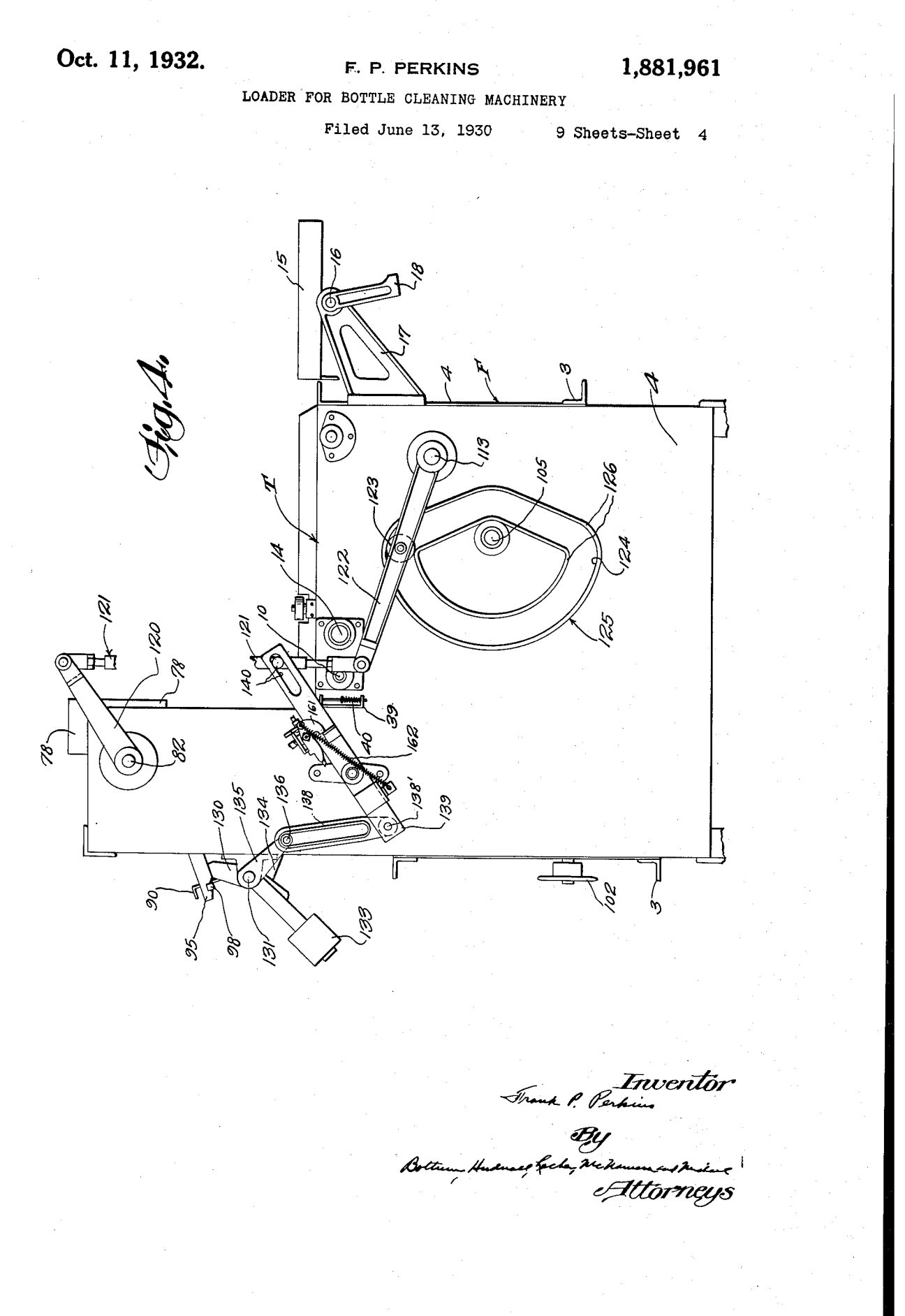

Oct. 11, 1932.　　　　F. P. PERKINS　　　　1,881,961
LOADER FOR BOTTLE CLEANING MACHINERY
Filed June 13, 1930　　　9 Sheets-Sheet 4

Oct. 11, 1932.  F. P. PERKINS  1,881,961
LOADER FOR BOTTLE CLEANING MACHINERY
Filed June 13, 1930  9 Sheets-Sheet 5
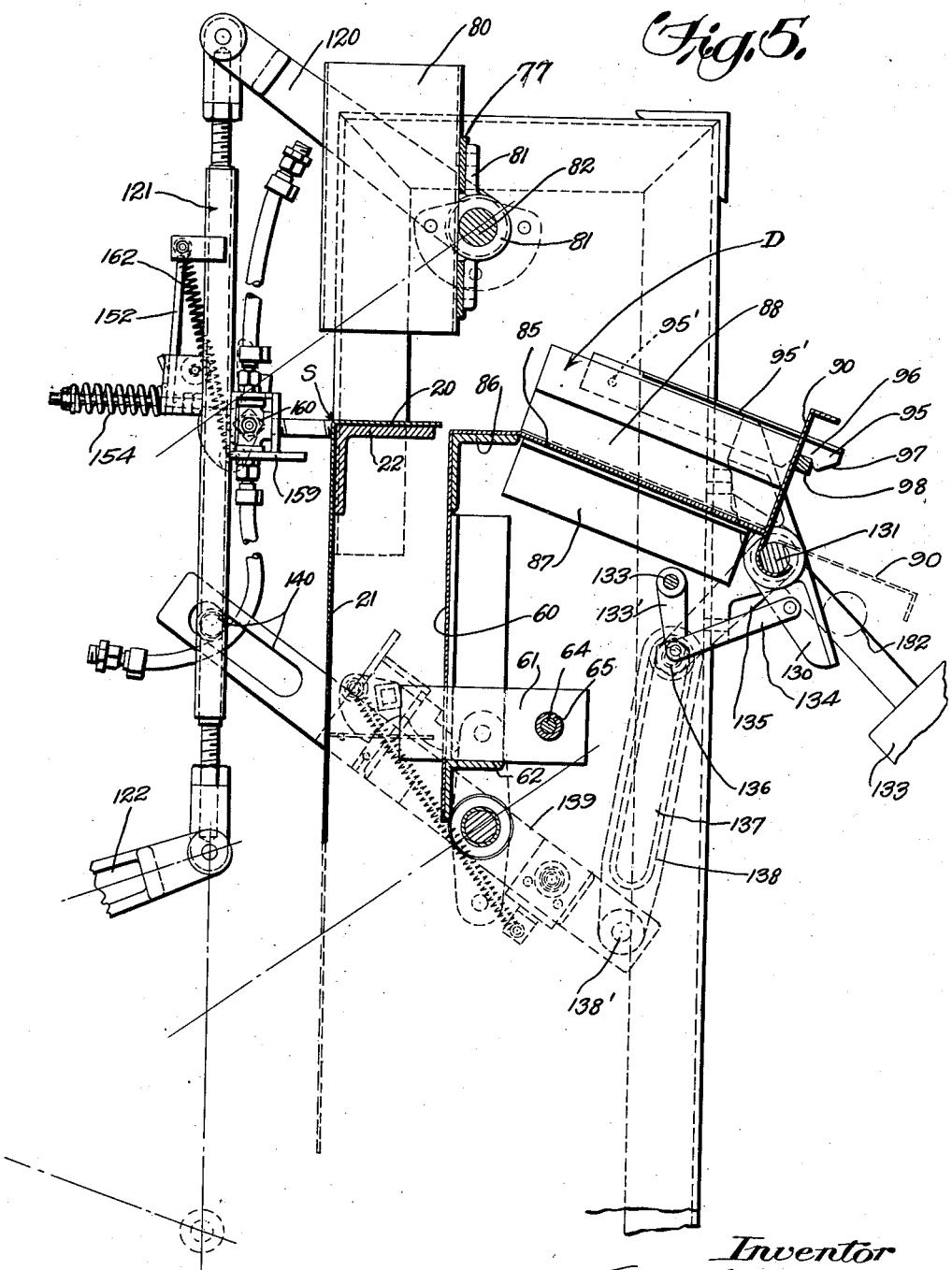

Oct. 11, 1932.  F. P. PERKINS  1,881,961
LOADER FOR BOTTLE CLEANING MACHINERY
Filed June 13, 1930  9 Sheets-Sheet 6
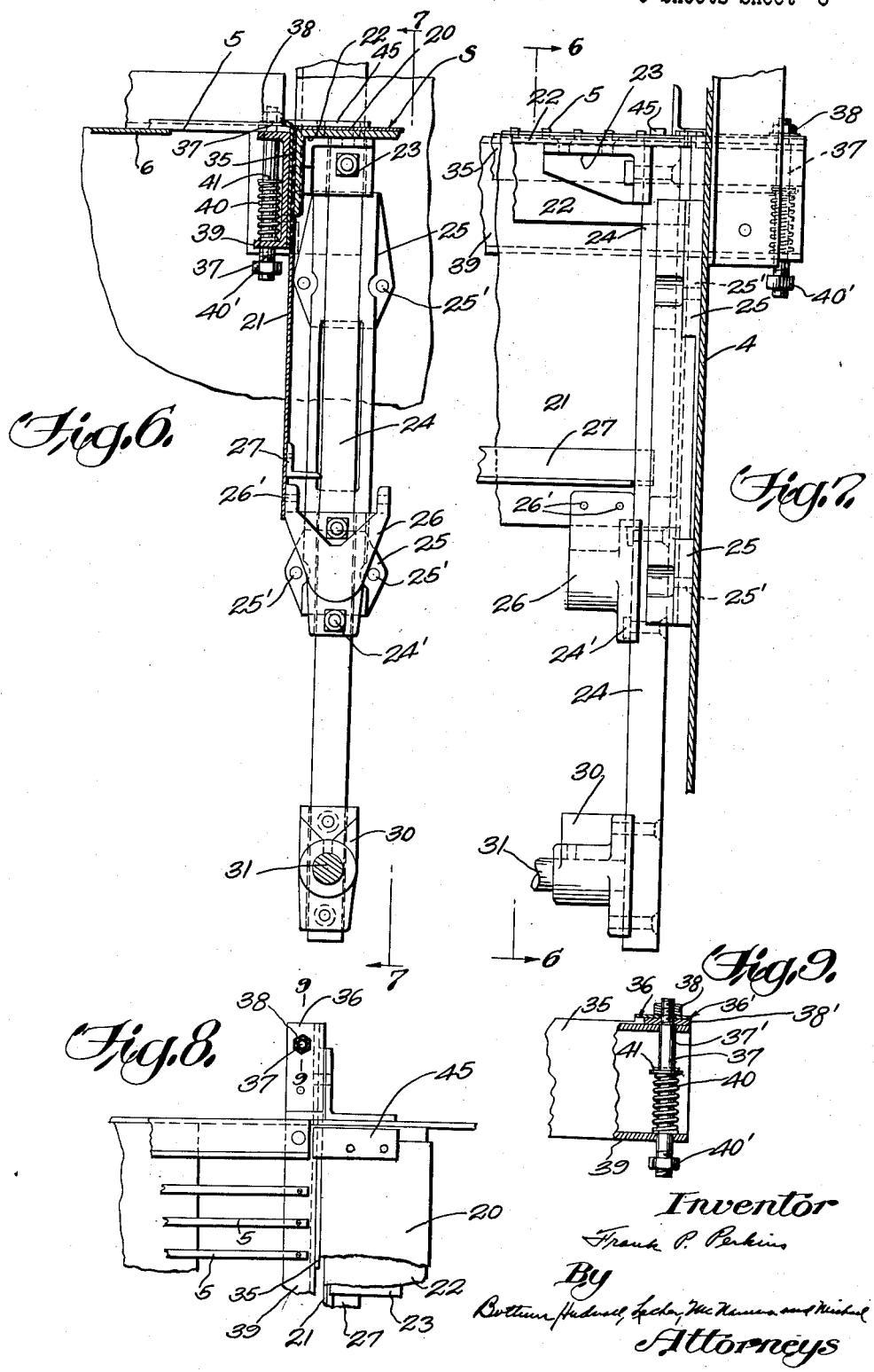

Oct. 11, 1932.   F. P. PERKINS   1,881,961
LOADER FOR BOTTLE CLEANING MACHINERY
Filed June 13, 1930   9 Sheets-Sheet 7
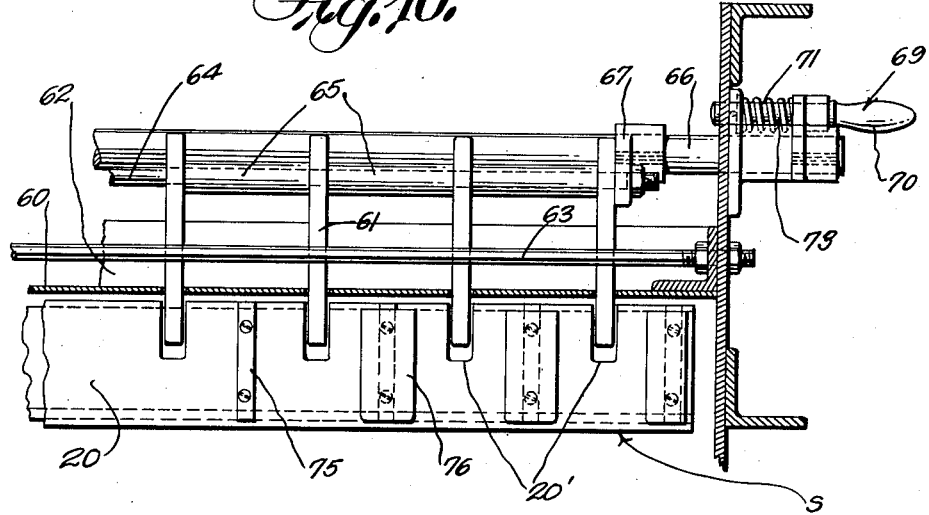
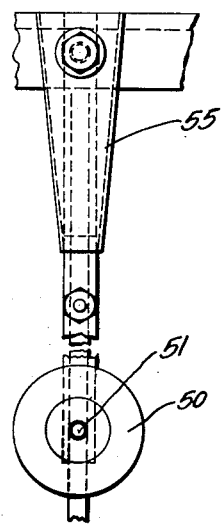
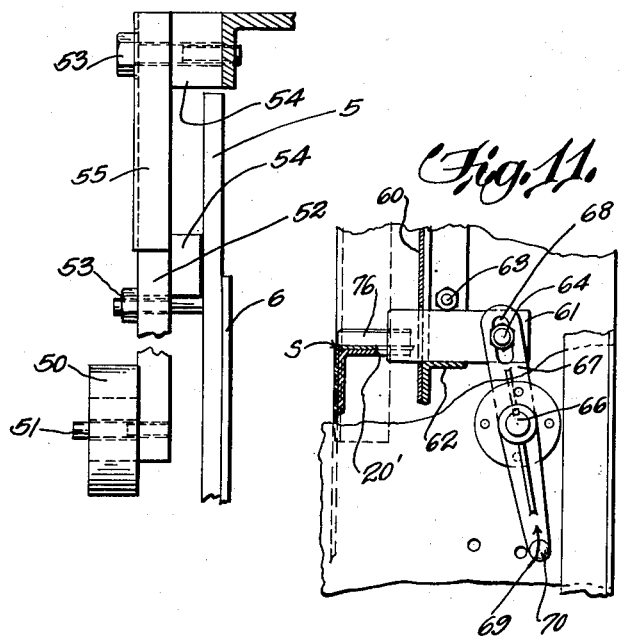

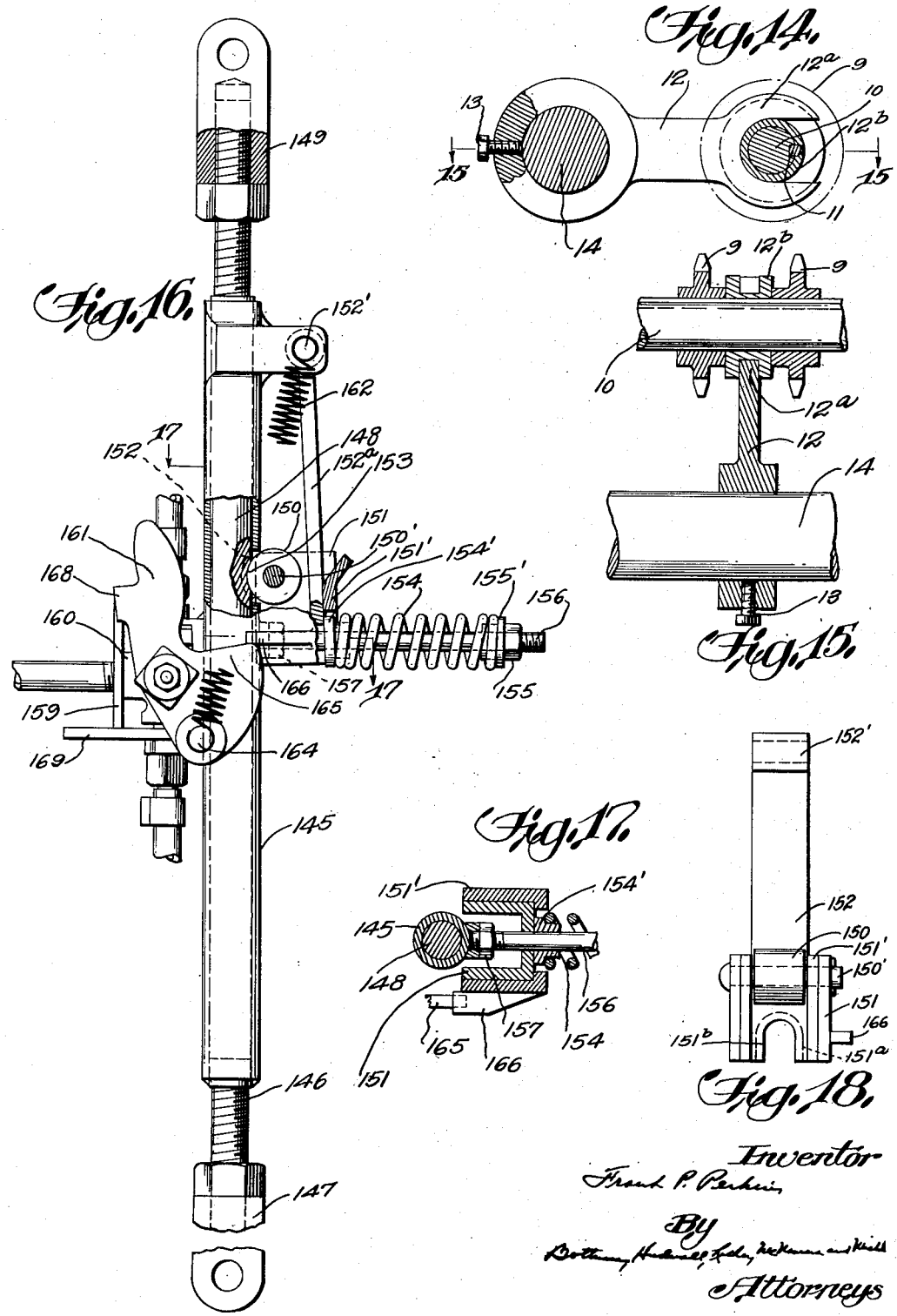

Oct. 11, 1932.  F. P. PERKINS  1,881,961
LOADER FOR BOTTLE CLEANING MACHINERY
Filed June 13, 1930  9 Sheets-Sheet 9
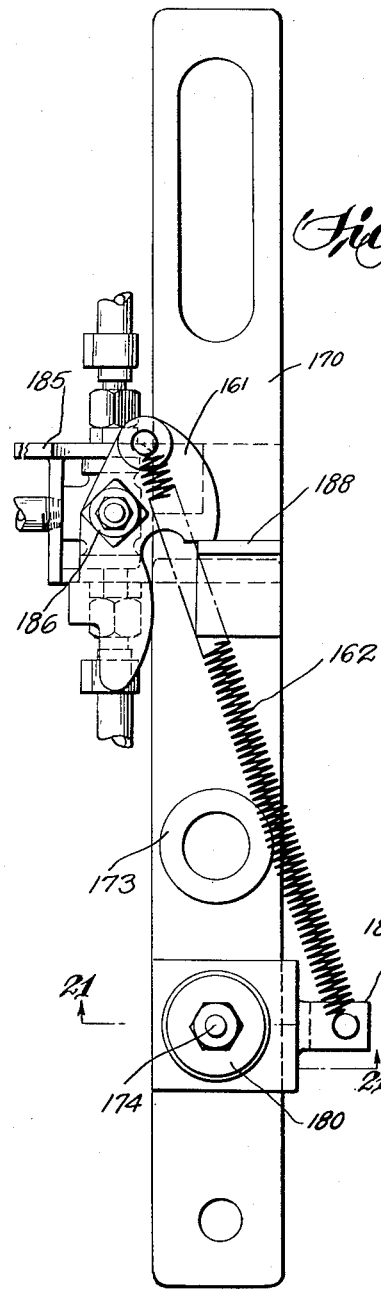
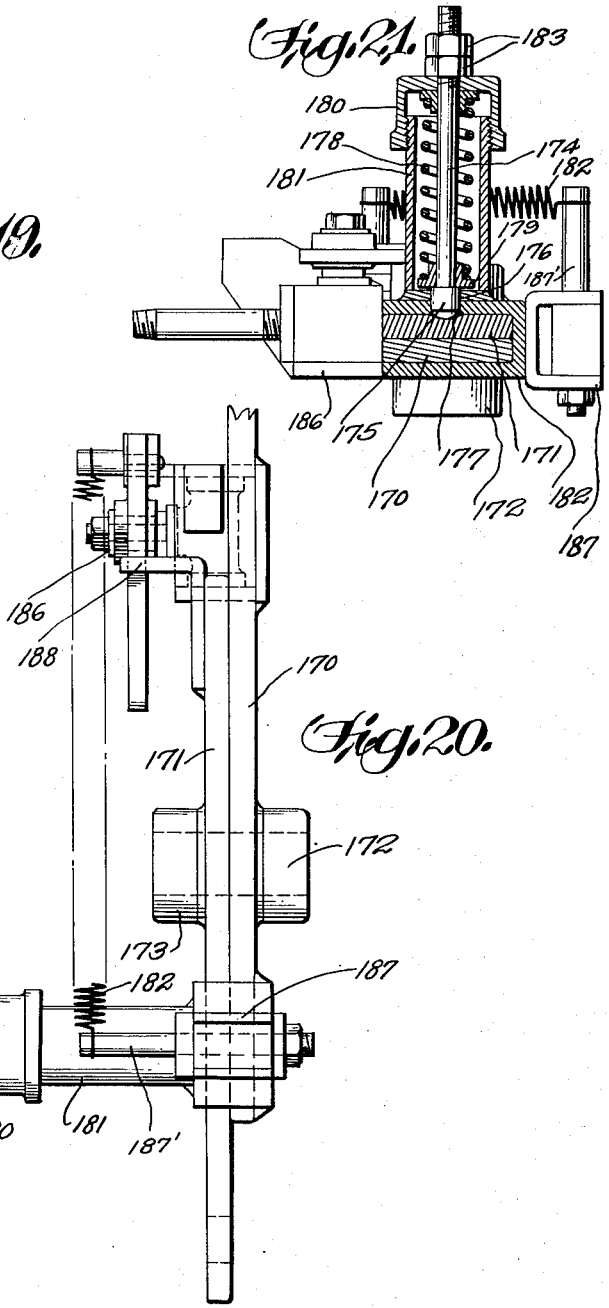

Patented Oct. 11, 1932

1,881,961

UNITED STATES PATENT OFFICE

FRANK P. PERKINS, OF WAUKESHA, WISCONSIN, ASSIGNOR TO MICHAEL YUNDT COMPANY, OF WAUKESHA, WISCONSIN, A CORPORATION OF WISCONSIN

LOADER FOR BOTTLE CLEANING MACHINERY

Application filed June 13, 1930. Serial No. 460,824.

This invention relates to an automatic loader for bottle washing machinery as, for example, for the compartments of the bottle holders of a soaker or for the bottle holders of the conveyors or receivers or the washing machine proper.

One of the principal objects of the present invention resides in the provision of an automatic loader of this character in which the bottles may be deposited in indiscriminate fashion and without regard to any particular arrangement on a conveyor and are automatically arranged in row formation with the bottles transversely spaced in precisely the same manner in which they are in the compartments or pockets of the bottle holder or receiver of the soaker or washer. Following the formation of the bottles in rows they are elevated and transferred into bottle delivery slides or chutes and during their elevation and transference and while they are in the chutes or slides the row formation is maintained. The delivery chutes or slides have their discharge ends located at the receiving station of the washer or soaker and are coordinated in their action with the mechanism of the washer or soaker so that as a bottle holder or receiver is brought to rest at the receiving station a trip plate at the lower end of the chute or slide is automatically released to permit the bottles in the chutes or slides to feed by gravity into the pockets or compartments of the bottle holders or receivers. In other words, the action of the loading mechanism is coordinated with the operation of the soaker or washer so that as fast as the holders or receivers are brought to the receiving station they are automatically supplied with bottles.

Another object of the invention is to provide a motor which is readily and easily adapted for handling bottles of different sizes as, for example, quart bottles, pint bottles, half pint bottles or bottles of other sizes.

A further object of the invention resides in the organization with the loader of safety devices acting to automatically stop the operation of the loader and of the soaker or washer in the event any of the parts of the mechanism jam or become fouled with improperly positioned or broken bottles.

A still further object of the invention resides in the provision of a bottle loader of this character which is of simple and durable construction, reliable, effective and speedy in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 4 is a view in side elevation looking at the opposite side of the machine from that viewed in Figure 2;

Figure 5 is a detail view partly in vertical section and partly in elevation showing the tiltable bottle pockets, the delivery chutes or slides and the operating mechanism therefor and associated parts;

Figure 6 is a detail sectional view taken on line 6—6 of Figure 7 and showing part of the mechanism for elevating the bottle lifting shelf;

Figure 7 is a view in section taken on line 7—7 of Figure 6;

Figure 8 is a fragmentary top plan view of the structure shown in Figures 6 and 7;

Figure 9 is a detail sectional view taken on line 9—9 of Figure 8 and illustrating the connection between the spring biased pins and the flanges of the stop plate;

Figure 10 is a view partly in top plan and partly in horizontal section illustrating the dividing blocks and bottle stops employed in conjunction with the bottle lifting shelf;

Figure 11 is a fragmentary detail view partly in side elevation and partly in section illustrating operating means for the adjustable stops;

Figure 12 is a detail view in top plan showing one of the guide arrangements employed in conjunction with the conveyor for effecting proper transverse spacing of the bottles as they are fed to the shelf;

Figure 13 is a view partly in side elevation and partly in vertical section illustrating the structure shown in Figure 12;

Figure 14 is a detail view partly in vertical section and partly in elevation illustrating one of the alining braces for the conveyor driving sprocket shaft;

Figure 15 is a sectional view taken on line 15—15 of Figure 14;

Figure 16 is a detail view partly in side elevation and partly in section illustrating a safety stop mechanism embodied in the link employed for tilting the bottle pockets;

Figure 17 is a detail view on line 17—17 of Figure 16;

Figure 18 is a view in elevation showing the latching roller and its mounting on the swingable arm and swingable bracket;

Figure 19 is a view in elevation illustrating the automatic safety stop embodied in the rocking lever of the operating mechanism for the trip plate employed at the lower end of the discharge chutes of the loader;

Figure 20 is a view in elevation looking toward the right hand side of Figure 19; and Figure 21 is a view in section taken on line 21—21 of Figure 19.

Figure 1:
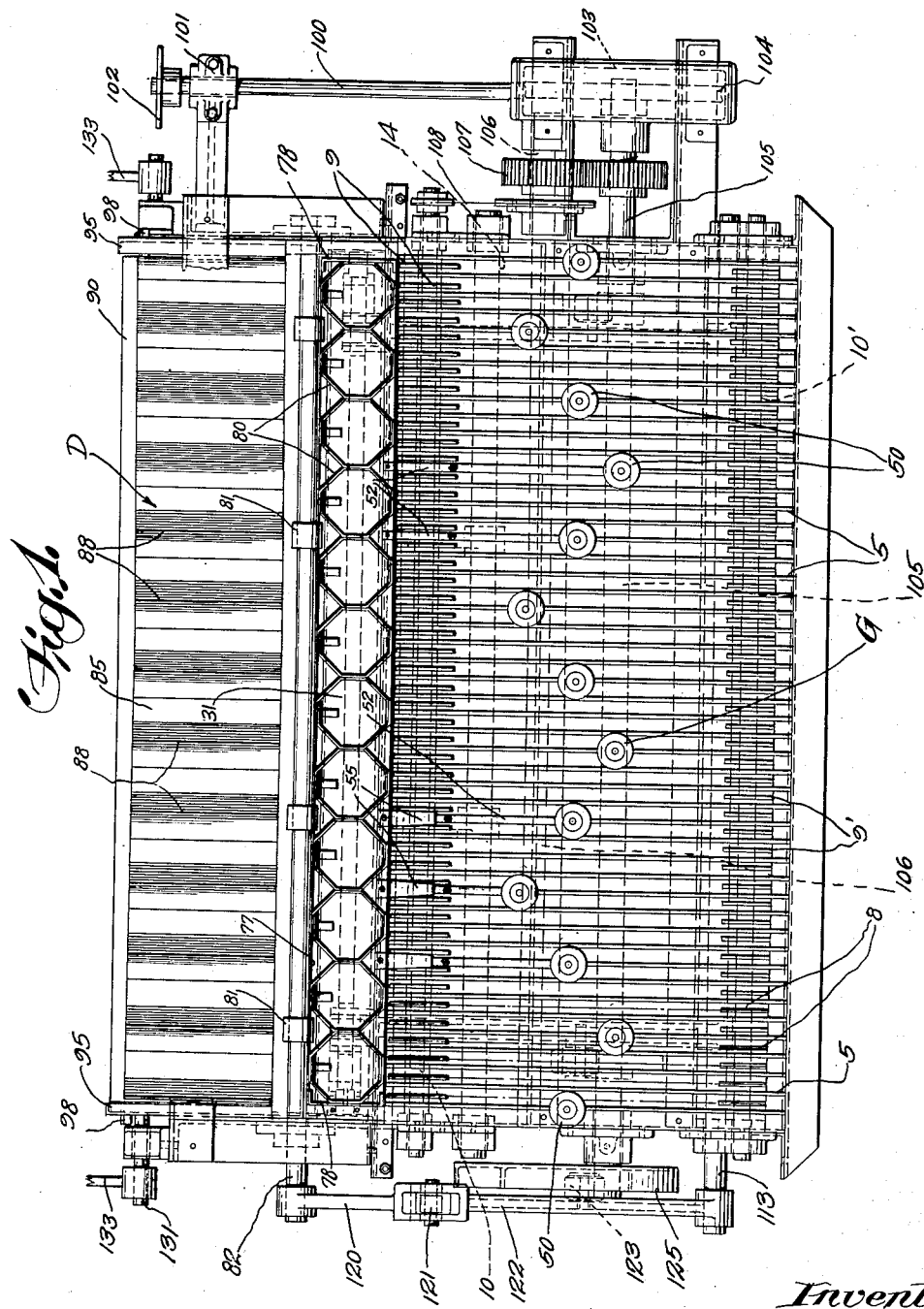
Figure 1 is a plan view showing a loader embodying the present invention, parts being omitted for the sake of illustration.
Figure 2:
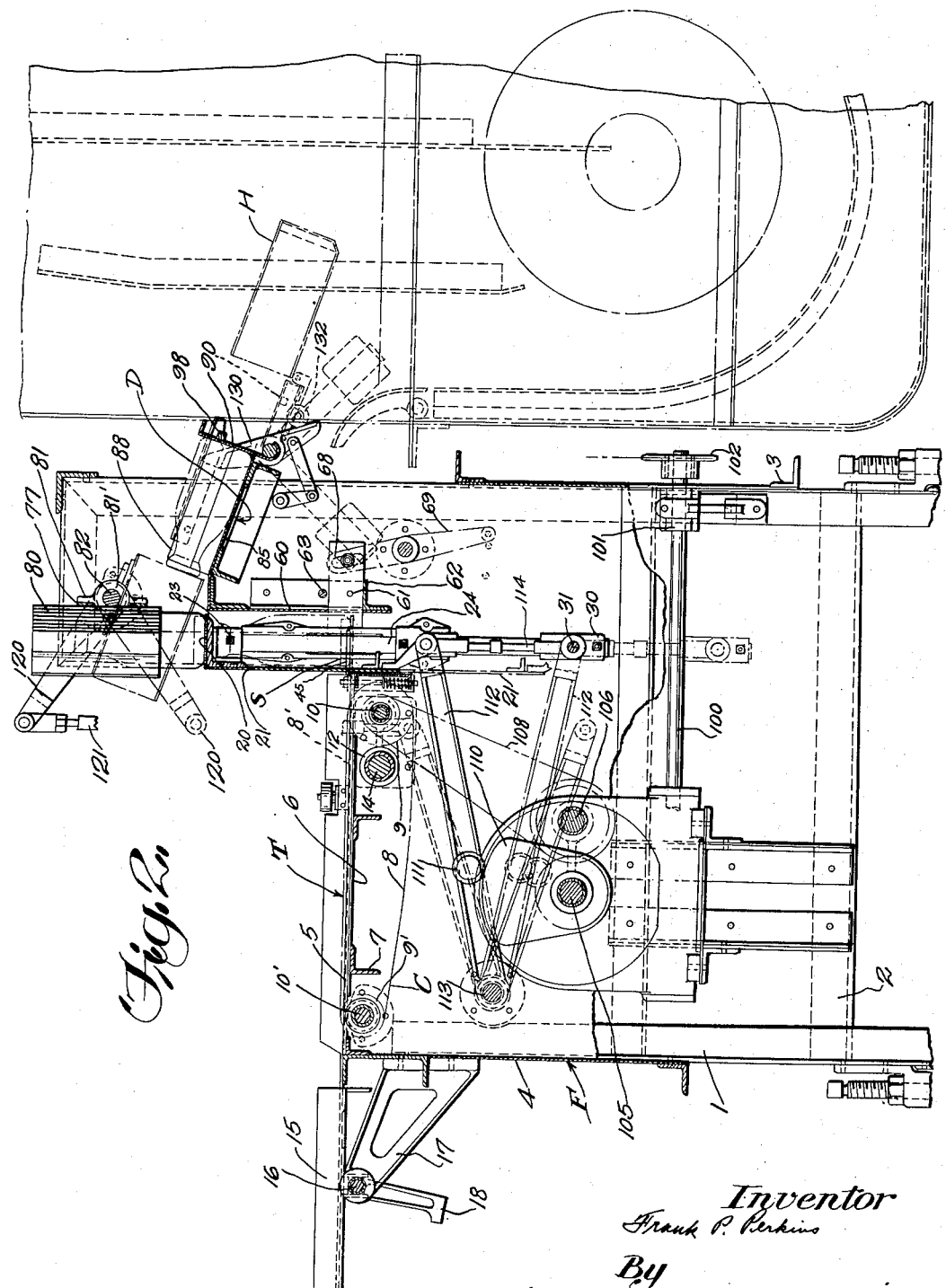
Figure 2 is a view partly in side elevation with a portion of the adjacent side plate or casing broken away and parts shown in longitudinal vertical section for the sake of illustration.

Referring to the drawings it will be seen that the present invention comprises generally a frame F which may be of any suitable construction and is shown as including corner posts 1 which may be angle bars and which are connected longitudinally and transversely by angle bars 2 and 3. Suitable sheathing 4 in the form of metal plates may be attached to the frame to increase its strength and rigidity and to form a sort of housing or casing enclosing the internal parts of the mechanism. At the top of the frame a table, designated generally at T, is provided and includes a plurality of longitudinally extending transversely spaced strips 5, the end of which are secured to the fixed elements of the frame and the intermediate portions of which rest on a supporting plate 6 secured to transverse angle bars 7 of the frame structure, as shown in Figures 1, 2 and 6. A plurality of endless chain conveyors designated generally at C are organized with the table and each includes an endless chain 8 trained about sprocket wheels 9 and 9' mounted on shafts 10 and 10' arranged at the ends of the table, each sprocket chain 8 having an upper run 8' running in between a pair of adjacent strips 5. The sprockets 10' are merely idlers or guides and may be replaced by a fixed or revolvable shaft having spaced circumferential grooves, one such groove being provided for each sprocket chain. The chains are of such proportions and dimensions that the top surface of the links thereof, when the links are located in the upper run 8', are disposed in a plane approximately coincident or slightly above the plane of the top surface of the strips 5. As shown generally in Figure 2 and in detail in Figures 14 and 15, the driving sprockets 9 are spaced along their driving shaft 10 and are keyed thereto as at 11. In order to permit the shaft 10 and its end bearings to be made small and facilitate alinement and thus allow the sprocket wheels 9 and the portions of the chains 8 running therearound to be closely adjacent to the bottle lifting shelf S (later described) and also to properly position the chains, auxiliary supports or braces 12 are provided and have their forked ends 12ᵃ engaging bushings 12ᵇ provided between adjacent sprocket wheels, the braces 12 being rigidly secured as at 13 to a fixed supporting shaft 14 suitably fixed to side members of the main frame.

At one end of the table a loading platform 15 is provided (see Figure 2) and is tiltably supported by a shaft 16 mounted on fixed brackets 17. The brackets carry a stop 18 which limits the tilting movement of the table. When the platform is swung down against the stop, a case of bottles may be placed thereagainst and when the platform and case are tilted back to the horizontal position shown in Figure 2, the case, with the bottles still therein, may be slid across the platform and onto the table T, after which the case is lifted off and the bottles are carried along the table T by the runs 8' of the endless chain conveyors.

At the opposite end of the table a bottle lifting shelf designated generally at S is provided. The structure of the shelf S is shown to advantage in Figures 2, 5 and 6, and, as illustrated, comprises a horizontal plate 20 having a depending skirt 21. In the corner between the plate 20 and its skirt 21 a reinforcing angle 22 is fitted and secured. Attaching brackets 23 are secured to the angle 22 adjacent its ends and are fastened to the upper ends of vertical bars 24 which serve as lifting and guide bars for the lifting shelf. Each bar 24 is slidable through vertical spaced and integrally connected guides 25 fixed as at 25' to one of the sheathing plates 4 of the frame. The bars 24 are also interconnected with the skirt 21 by means of brackets 26 which are secured to the bars as at 24' and as at 26' to the lower end of the skirt. Adjacent the brackets 26 the skirt may be stiffened by a reinforcing angle 27. The brackets 26 may be double-winged, as shown in Figure 6 so as to be used interchangeably on either side of the machine. The lower ends of the bars 24 have bearing brackets 30 secured thereto and receiving and fixed to the ends of a tie rod 31 extending between the bars 24 and also cooperable with the lifting mechanism for the bottle shelf, as will hereinafter more clearly appear.

In between the bottle lifting shelf and the adjacent end of the table T a vertically slidable stop plate 35 is arranged. At its ends the stop plate 35 is provided with angular lugs or extensions 36 having horizontal portions 36' (see Figure 9) which are secured to vertically slidable pins or bolts 37 by means of nuts 38 threaded on the reduced ends of the pins and clamping the lugs 36 against washers or reinforcing strips 38' engaged with shoulders 37' provided on the pins 37. The pins 37 are slidable through the upper and lower flanges of a channel 39 embodied in the frame structure and are biased to elevated position by a spring 40 encircling the pin and abutting the lower flange of the channel 39 at its lower end and a cross pin 41 at its upper end. Nuts 40' are threaded on the lower end of each pin 37 and engage the lower flange of channel 39 to limit upward movement of the pins 37 and stop plates 35.

When the bottle shelf S is in its lowermost position, that is, in the position wherein it is adapted to receive bottles from the table T, the stop plate 35 is held depressed and in operative position against the action of the springs 40 by means of pressure fingers 45 secured to the horizontal plate 20 of the shelf and projecting over and engaging the upper edge of the plate 35 and holding the plate depressed. As the bottle lifting shelf is elevated the pressure fingers 45 are carried with it and the stop plate 35 under the influence of the springs 40 is elevated to its uppermost position in which it arrests the feed of the bottles from the table T toward the shelf S thereby protecting the bottles from scraping engagement with the skirt 21 of the bottle lifting shelf.

During the travel of the bottles along the table T the upper horizontal runs 8' of the endless chains of the conveyor C cooperate with bottle guides designated generally at G to effect proper transverse spacing of the bottles. For small bottles such as pints and half pints the guide G consists of a plurality of transversely spaced rollers 50, each of which is freely swiveled or pivoted or a short vertical pin 51 carried at the outer end of a guide strip 52 (see Figures 12 and 13). Each guide strip 52 is held on the table by means of bolts and nuts 53 and spacers 54. Each guide strip 53 is also designed to receive a tapered guiding member 55 in the form of a tapered channel which may be fitted over the strip 52 and held in position by the frictional engagement of the forward ends of its side walls with the strips 52. In Figure 1, a number of the guide strips 52 and guide members 55 are omitted for the sake of simplicity in illustration. As the bottles are moved along the strips 5 by the chain conveyors 8' they may lie in the path of the rollers 50 and in such event they will be carried around the rollers and into the spaces between adjacent rollers 50. Subsequently, they come under the influence of the tapered guide members 55, and while controlled by these guide members 55 are delivered on the horizontal plate 20 of the bottle lifting shelf.

For large size bottles, such as quarts, the rollers 50 and tapered guides 55 are removed and the guide strips 52 coact with the chains in effecting the proper transverse positioning of the bottles.

When large size (quart) bottles are being handled they are limited in their movement onto the shelf by a back plate 60 (see Figures 2, 5 and 9) secured in stationary position just to the rear of the shelf and supported on stationary parts of the frame. For smaller sized bottles adjustable stops 61 are provided and are in the form of sliding blocks which extend through apertures in the plate 60 and ride across the horizontal flange of a supporting angle 62 thereof (see Figures 2, 10 and 11). A cross rod 63 prevents upwardly displacement of the stops 61. The stops 61 are tied together and held in proper transverse spacing by a tie rod 64 and spacing sleeves 65. For simultaneously adjusting the stops 61, a rock shaft 66 is provided and has one or more cranks 67 fixed thereto and formed with a slot 68 through which an end portion of the tie rod 64 extends. For operating the shaft 66, a crank handle 69 is fixed to the portion of the shaft 66 which projects beyond one side of the machine. The crank handle 69 has a slidable hand grip 70 carrying a latching pin 71 selectively cooperable, under the influence of a spring 73, with angularly spaced openings 72 in the frame. The function of the latching pin 71 is to releasably secure the crank handle in any adjustment. The horizontal plate 20 of the bottle lifting shelf is provided with a slot 20' for each stop 61 so that the stops 61 do not interfere with the movement of the shelf in any of their adjustments.

The transverse spacing of the bottles which is effected by the conveyors and spaced guides of the table, is maintained on the bottle lifting shelf by means of dividers which, for the large bottles, consists of dividing strips 75. For the smaller bottles dividing blocks 76 are fitted over the strips 75, the blocks 76 having grooves in their undersurfaces frictionally engaged with the strips 75.

When the bottle lifting shelf is elevated to the full line position shown in Figure 2, the bottles are carried into tilting pockets designated generally at 80. The pockets 80 are rigidly connected together in any suitable manner, as for example, by means of two vertically spaced transversely extending connecting strips 77 suitably secured to each pocket and secured at their ends to channel braces 78 also fastened to the end pockets (see Figure 1). Brackets 81 are securely fastened to the strips 77, the bearing portions 81' of the bracket 80 (see Figures 2 and 5) projecting through the space between the strips and being fixed to a rock shaft 82 supported for rocking movement in the frame of the machine. During the elevation of the shelf these pockets 80 are vertically disposed and as they are open ended the bottles freely pass thereinto since the bottles have been now established in row formation and transversely spaced in accordance with the transverse spacing of the pockets 80.

When the pockets 80 are tilted to the inclined position shown by dotted lines in Figure 2, they are alined with inclined chutes or slides designated generally at D and comprising a common bottom plate 85 supported on angle brackets 86 and 87 and vertical dividing plates 88 which define an individual slide-way for each bottle (compare Figures 1, 2 and 5). The lower ends of the chutes are closed by a common closure or trip plate 90 which, in its open position, supplements or forms an extension of the bottom of the chute and terminates adjacent the pockets or compartments of the bottle holders H of the soaking tank when the bottle holders are at the receiving station of the soaking tank, all as illustrated in Figure 2. The trip plate 90 of the bottle chutes is normally held in closed position by latches 95 pivotally supported adjacent one end as at 95' (see Figure 5) and having notches 96 adjacent their beveled noses 97, the notches 96 designed to coact with projections 98 at the opposite ends of the plate 90. The projections 98 are preferably formed by the end portion of a transversely extending rod securely fixed to the trip plate 90.

The mechanism of automatically releasing these latches and for returning the trip plate 90 to normal position as well as the mechanism for driving the conveyor and for tilting the bottle pockets 80 is driven in synchronism from the soaker or washer and will now be described.

As shown in Figures 1 and 2, this mechanism includes a drive shaft 100 supported in bearings 101 on the machine and having at one end a sprocket 102 which is driven by appropriate chain and sprocket gearing or the like from the drive line of the soaker or washer. The soaker or washer may be of any suitable type, as for example, similar to that of Patent 1,729,193, granted September 24, 1929, to Henry J. Stock, for bottle cleaning apparatus. At the end of the shaft 100 opposite its sprocket 102 a worm 103 is fixed thereto and meshes with a worm wheel 104 fixed to a cam shaft 105 extending transversely of the machine (compare Figures 1 and 3). A counter-shaft 106 is driven from the cam shaft 105 in a reverse direction by twin gears 107 from the counter-shaft 106. Chain and sprocket gearing 108 drives the shaft 10 of the conveyors C from the shaft 106.

On the cam shaft 105 bottle shelf lifting cams 110 are fixed and engage laterally projecting rollers 111 carried by lifting arms 112. Each lifting arm 112 has one end pivotally supported on a shaft 113 and has its other end pivotally connected to the upper end of an adjustable link 114, the lower end of each link 114 being pivotally connected to the tie rod 31.

As will be seen from Figure 2, the cams 110 are so shaped as to raise and lower the arms 112 and the lifting shelf S at the proper speed but with a smooth and easy movement and to maintain the shelf S in elevated and in lowered position for a certain predetermined time, this time interval in which the shelf is maintained in either of its two positions being sufficient to permit loading of the bottles on the shelf in its lower position and transferring of the bottles from the shelf to the inclined chutes when the shelf is raised.

For the purpose of rocking or tilting the bottle pockets 80 at the proper time, the shaft 82 which is common to and carries all of these pockets has a crank arm 120 fixed to one end thereof, the crank arm 120 being connected by a link structure designated generally at 121 to an operating arm 122, the ends of the link structure being pivotally connected to the crank arm 120 and operating arm 122, respectively. The operating arm 122 is pivotally supported on an end of the shaft 113 and is provided with an inwardly and laterally extending stud 123 which engages in a cam groove 124 of an operating cam designated generally at 125. The cam groove 124 is defined by parallel flanges 126 formed on the cam. The hub or center of the cam 125 is keyed to the cam shaft 105. As shown in Figure 4 the cam 125 is so shaped as to leave the bottle pockets 80 or rather to maintain these bottle pockets 80 in vertical position for the major portion of the time interval required for a revolution of the cam. During the remaining portion of the revolution of the cam 125 the walls of the cam groove operate on the roller 123 to rock the roller and the arm 122 and consequently tilt the bottle pockets 80 first in one direction and then in the other, as indicated by a comparison of the full and dotted line showing of Figure 2. Preferably, the cam groove is shaped and designed to hold the bottle pockets in an inclined position for an interval sufficient to permit the bottles to slide out of the pockets and into the chutes D.

Figure 3:
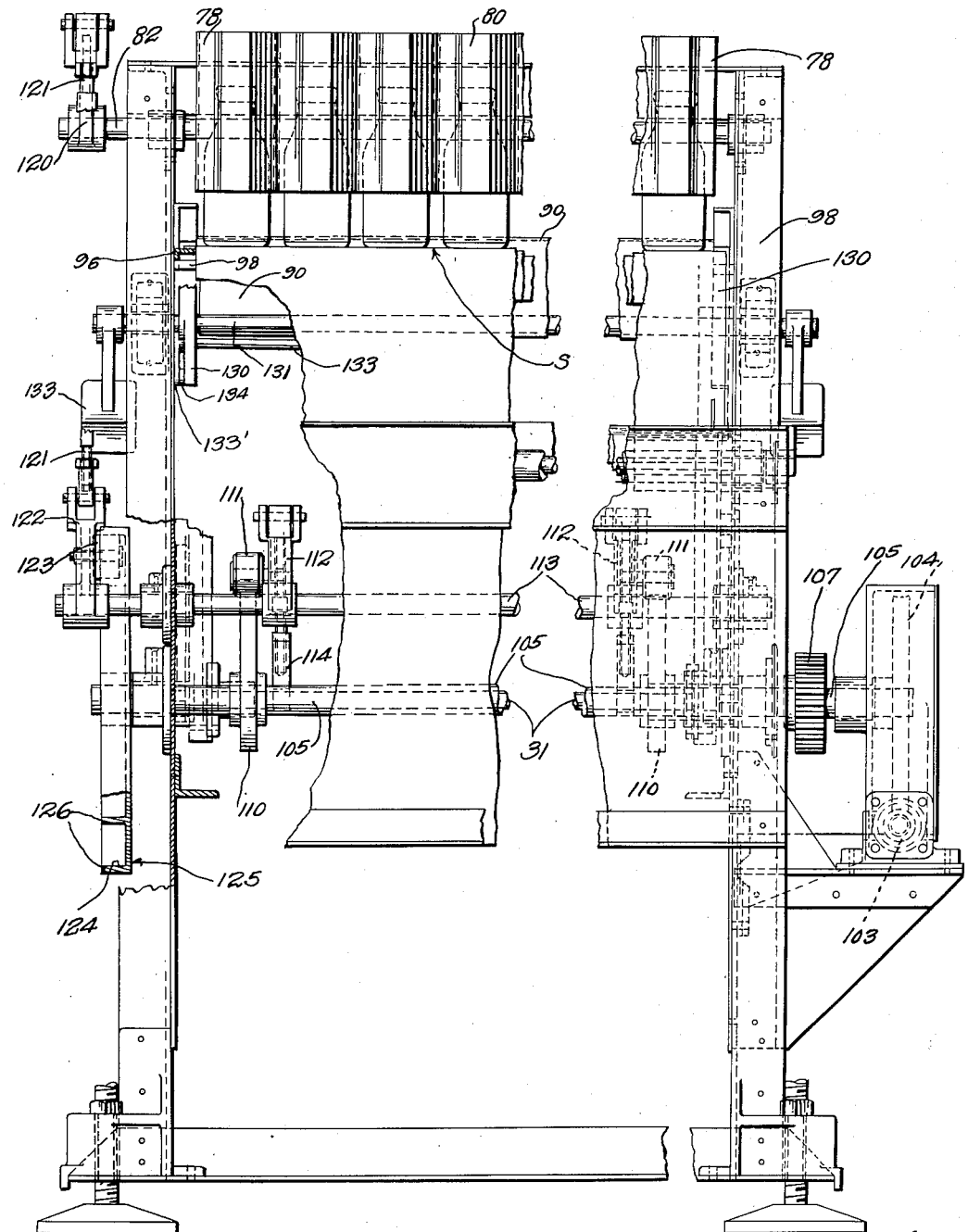
Figure 3 is a view partly in end elevation with a portion of the end plate of the enclosing casing broken away to show the lifting mechanism for the bottle elevation shelf.

For the purpose of automatically releasing the combined stop and slide plate 90 at the delivery end of the chutes 88 at the proper times, a trip lever 130 is freely pivoted adjacent each end of the shaft 131 that carries the plate 90 (compare Figures 3, 4 and 5). The trip levers 130 lie in the path of rollers or pins 132 (similar to pins 24 of Patent 1,729,193) carried by the covers of the bottle holders of the soaker or washer. These rollers 132 actuate the tripping levers 130 when the bottle holder comes to the receiving station of the soaker and consequently is alined with the chutes 88. The upper end of the tripping lever 130 is engageable with the flange 95' of the latch 95 and when rollers 132 rotate trip levers 130 in a clockwise direction from the position shown in Figure 4, they lift the latches 95 and permit the plates 90 to swing to the dotted line position shown in Figures 2 and 5 under the influence of the counter-weights 133ª connected to the shaft 131. The tripping levers 130 are constrained to simultaneous operation by means of a transverse rock shaft 133 having crank arms 133' fixed thereto and connected to levers 130 by links 134. It is desirable to tie the tripping levers 130 together in this manner to insure operation of both in the event one of the pins or rollers 132 of the covers of the bottle holders of the soaker should be broken off or fail to function timely for any reason.

For returning the plate 90 to the position in which it closes the lower ends of the chute a crank arm 135 is fixed to the shaft 131 and is connected by a pin 136 with an elongated slot 137 of a link 138, the lower end of this link being pivoted as at 138' to one end of a rock lever 139, the opposite end of which has a pin and slot connection 140 with a link arrangement 121.

The slotted link 138 travels freely upward relative to the pin of the crank arm 135 with which it coacts to avoid interference with the tilting of the bottle pockets 80 to inclined position but when trip plate 90 falls over to the dotted line position in Figure 5 then pin 136 travels up in the slot 137 of the elevated link 138 so that on the return movement of pocket 80 to vertical position, the link 138 will engage pin and pull it downwardly to return trip plate 90 to closed position. Of course, when bottle pockets 80 return from inclined to vertical position, then operating link 121 moves downwardly to rotate lever 139 in a clockwise direction, as viewed in Figure 5, and thereby pulls link 138 downwardly.

In the link arrangement 121 and in the rock lever 139 a safety stop mechanism is provided which operates to automatically shut off the power in the event any of the mechanism handling the bottles becomes fouled or jammed. If, for instance, a bottle is not properly positioned on the shelf S and instead of entering a bottle pocket 80 strikes an edge of the bottle pocket the result will be a lengthening of the lever 121, this lever being made of sectional construction for this purpose and operating upon lengthening to manipulate a valve controlling the action of a fluid pressure motor which in turn controls a clutch between the motor and the drive line of the machine. A similar arrangement is incorporated in the locking lever 130 and operates in the event the mechanism in the lower ends of the chutes are jammed, by a bottle or for other reasons. The general features of this automatic safety mechanism is shown and described in Patent 1,729,193, granted September 24, 1929, to Henry J. Stock for bottle cleaning apparatus, attention being particularly called to the clutch 28, the fluid pressure motor 31 and 32, and the valves 37 and 38 controlling the operation of the fluid pressure motor in the patent referred to. In their general aspects, these features are incorporated in the present machine, the present machine differing principally from the arrangement of the patent in the structure of the mechanism employed for opening the controlling valves.

Referring to the drawings and more particularly to Figures 15, 16 and 17, it will be seen that the link 121 includes a tubular member 145, the lower end of which terminates in a threaded stud 146 adjustably connected to a yoke 147 which is pivoted to the operating arm 122. In the tubular or sleeve-like member 145 a rod-like member 148 is slidably fitted and has a yoke 149 adjustably connected to its upper end and pivoted to the crank arm 120. Normally, the members 148 and 145 are latched together by means of a roller 150 yieldably urged into engagement with alined recesses or notches 152 and 153 provided in the telescoped members 145 and 148, respectively. The roller 150 is rotatably supported on a pivot pin 150' which extends through openings provided therefor in interfitted U-shaped brackets 151 and 151'. The bracket 151 is formed integral with a swingable arm 152ª pivotally supported on the tubular member 145 as indicated at 152'. For urging the bracket 151, its arm 152ª and consequently the roller 150 toward the telescoped members 145 and 148 and thereby biasing the roller to latching position, a compression coil spring 154 is provided and encircles a stud or post 156 having its inner end threaded into a nut 157 welded to the tubular member 145. At its outer end the spring engages a spring seat 155' which, in turn, engages an adjustable abutment in the form of a nut 155 threaded on the post 156. At its inner end the spring 154 engages a spring seat 154' which is loosely received in a notch 151ª of the bracket 151' and which abuts the margin of the notch 151ᵇ formed in the bracket 151 to accommodate the post 156. In this way the tension of the spring is applied to bracket 151 and tends to force the same inwardly. The bracket 151' is also carried inwardly due to its interconnection with the bracket 151 by the pivot pin 150'.

A suitable support 159 is welded to the member 145 and carries a three-way valve 160 incorporated in the pressure supply line to the fluid pressure motor controlling the clutch incorporated in the drive of the machine and acting either to supply pressure to the fluid pressure motor or to vent the motor to the atmosphere, just as in the patent above referred to. The ported plug of the valve has a stem which is secured to an operating lever 161. Normally the lever 161 is held in the position in which pressure is supplied to the clutch by means of a retractile coil spring 162 having one end anchored on the lugs providing the support for the swinging bracket 151 and having its other end connected as at 164 with the valve lever 161. The lever 161 is provided with a shoulder 165 which engages an abutment 166 on the swinging bracket 151' when the bracket is in position to latch the parts of the link together. Should the mechanism be subjected to an excessive strain the member 148 will be pulled through the member 145 notwithstanding the action of the latching roller. This will involve a swinging of the bracket 151 and its arm 152ᵃ to the right, as viewed in Figure 16, until the edge of the abutment 166 clears the adjacent edge of the shoulder 165. Beyond this shoulder 165 a curved edge is provided which rides past the edge of the abutment 166 thereby tending to swing the bracket 151' on the pivot pin 150' to prevent the valve from moving with an excessive force. The lever 161 is limited in its swinging movement to open position by the action of a second stop lug 168 engaging an abutment 169 formed on the support 159.

A similar safety arrangement is incorporated in the rocking lever 139 and differs in details of construction for the reason that instead of being subjected to tension under the influence of its operating forces and of excessive strains the rocking lever 139 is subjected to a bending action.

As shown in Figures 19, 20 and 21, the rocking lever 139 includes complementary lever sections 170 and 171 having alined bearing openings 172 and 173 which receive the pin upon which the lever is fulcrumed and which permit the sections to move or swing relative to each other under the influence of excessive strains. Normally the lever sections 170 and 171 are latched together by means of a latching pin 174 having a rounded head 175 at its inner end which projects through an opening 176 in a U-shaped clip or bracket 182 welded to the lever section 170 and engages in a rounded recess or seat 177 provided in the lever section 171. The pin is urged to latching position by means of a compression coil spring 178, one end of which abuts a spring seat 179 engaged with the head of the latching pin and the other end of which abuts the removable cap 180 of a cylinder 181, the latter having its inner end welded to the bracket 182 secured to the lever section 170. Nuts 183 are threaded on the latching pin 174 and engage the cap 180 to limit the extent to which the latching pin may be projected by its spring 178 so that the latching pin is maintained in position in which resetting of the lever sections is facilitated. The lever section 170 carries a support 185 for a three-way valve 186 which is identical in construction with the three-way valve 160 and has an operating lever 161 biased to position in which the valve feeds pressure into the fluid pressure motor by spring 162 connected at one end of the lever and its other end to a pin 187' carried by a lug 187 welded to the bracket 182. Under the influence of the spring 162 the valve operating lever is held engaged with an abutment 188 provided on the lever section 171. When, however, the lever sections are shifted relative to each other under the influence of excessive strain the abutment 188 is disengaged from the shoulder of the valve lever, the valve lever swings to its venting or open position.

In operation the bottles are loaded on the table T and are fed therealong by the upper runs of the endless chains, the bottoms of the bottles sliding along the strips 5 and the sides of the bottles adjacent their bases being engaged and shifted transversely by the rollers 50 and tapered guide strips 55 to correctly position the same transversely with respect to each other. Finally, the bottles are carried onto the horizontal plate of the lifting shelf in between the dividing strips or blocks thereof and either up against the back plate 60 or stops 61 depending upon the size of bottles being handled. Of course, the bottles follow one another along the table and the foremost bottles are crowded onto the shelf. The machine is so timed that there will be an ample interval for the complete loading of the bottles on the shelf before the shelf begins to rise. Simultaneously with the rising of the shelf which is effected by the arms 112, cams and rollers 110 and 111, the stop plate 35 elevates to prevent the bottles on the table from being crowded into scraping engagement with the plate 21. The bottles on the horizontal plate of this shelf are carried up into the bottle pockets 80 and when they reach the extreme upper limit of their movement the shelf remains stationary for a certain period during which time the cam 125 comes into operation to tilt the bottle pockets 80 thereby shifting or transferring the bottles from the shelf S into the chutes 85. The bottles slide down the chutes 85 and are arrested in their downward sliding movement by the plate 90. When the holder or receiver in the soaker comes to the receiving station and is alined with the chutes 85 the rollers 132 trip the levers 130 to release the latches 95 and permit the bottles to slide down over the plate 90 and into the holders or receivers of the soaker. The subsequent operation of the link 121 incident to the return of the bottle pockets 80 to vertical position, returns the plate 90 to its closed position. In the meantime the bottle lifting shelf S has returned to its lower position and in so doing lowers stop plate 35. The operation is then repeated.

One of the important features of the invention resides in the novel means for segregating the bottles into groups, automatically arranging the bottles of each group in the same relation or position in which they are received in the bottle holders and simultaneously feeding the bottles so segregated and arranged to the delivery means which discharges into the bottle holders of the bottle cleaning machinery. These features are associated or embodied in the loading table and in the embodiment of the invention illustrated consist of the strips 5 between which the endless chain conveyors run and with which the guides G coact. This organization permits the depositing of the bottles on the table in an indiscriminate fashion and without regard to any particular arrangement. Preferably, the bottles are simply loaded on the table from cases. Another advantage of this arrangement is that the capacity of this organization to segregate and arrange bottles is such as to enable it to keep in step with the subsequent handling or transferring operations. The bottles crowd against each other on the table and in between the guides and whenever the bottle lifting shelf is lowered and, of course, at such time the stop plate 35 is lowered, a row of bottles is immediately and quickly pushed onto the bottle lifting shelf. The provision of the shelf, the tiltable pockets and inclined chutes enables the table to be arranged low enough to facilitate loading of the bottles thereon and yet positions the discharge ends of the chute at the receiving station or loading station of the bottle cleaning machinery. This advantage is had, in addition, of course, to the fact that this organization of lifting shelf, tiltable pockets and inclined chute preserve the segregation and arrangement of the bottles and coordinate and deliver into the bottle cleaning machinery with the operation of the bottle cleaning machinery.

The invention claimed is:

1. A loader for bottle cleaning machinery including a table on which the bottles are loaded, cooperating conveyors and guides for carrying the bottles along the table and effecting a predetermined transverse spacing of the bottle, a bottle lifting shelf arranged at the discharge end of the table and receiving the bottles from the conveyors, means for raising and lowering the shelf, tiltable bottle pockets receiving the bottles in the elevated position of the shelf, means for tilting the bottle pockets, delivery chutes receiving the bottles from the bottle pockets when the latter are tilted, a combined gate and slide at the lower end of the delivery chutes and operable in discharging position to deliver the bottles to the holders of the bottle cleaning machinery.

2. A loader for bottle cleaning machinery comprising means for arranging the bottles in row formation and means for transferring the bottles while in row formation into the bottle holders or receivers of the bottle cleaning machinery, and including bottle delivering chutes arranged adjacent the receiving station of the bottle cleaning machinery, gates at the lower ends of the chutes and operating mechanism for the gates controlled by the bottle receivers of the bottle cleaning machinery.

3. A loader for bottle cleaning machinery including a table on which the bottles are loaded, conveyors for carrying the bottles along the table, guides cooperating with the conveyors and having removable guide rollers to adapt the loaders for use with bottles of various sizes, said conveyors and said guides operating to arrange the bottles in the same manner in which they are arranged in the bottle cleaning machinery, and means for transferring the arranged bottles to the bottle cleaning machinery.

4. A loader for bottle cleaning machinery including a table on which the bottles are loaded and having longitudinally extending spaced strips, endless conveyor chains having runs disposed between the said strips, cooperating guide means mounted on the strips and including guiding strips and removable rollers and tapered guide members, said guide means and said conveyor chains acting to arrange the bottles placed on the table into row formation and means for transferring the rows of bottles from the table to the bottle cleaning machinery.

5. A loader for bottle cleaning machinery comprising means for arranging the bottles in row formation, a bottle lifting shelf receiving rows of bottles from said means, means for elevating said bottle lifting shelf, tiltable bottle pockets into which the bottles on the shelf are entered when the shelf is raised, means for tilting said bottle pockets and a delivery chute having an indivdual slide-way for each bottle and positioned to receive the bottles from the tilted bottle pockets and to discharge the bottles into the compartments of a bottle holder of a bottle cleaning machine.

6. A loader for bottle cleaning machinery comprising means arranging the bottles in the same spaced relation with respect to each other in which they are positioned in the bottle cleaning machinery for transferring the bottles while so positioned into the bottle holders of the bottle cleaning machinery and including inclined delivery chutes, a combined gate and slide at the lower end of the chutes, and means controlled by the bottle cleaning machinery for automatically opening said combined gate and slide when a bottle holder of the bottle cleaning machinery is operatively positioned relative to said loader.

7. A loader for bottle cleaning machinery comprising means arranging the bottles in the same spaced relation with respect to each other in which they are positioned in the bottle cleaning machinery for transferring the bottles while so positioned into the bottle holders of the bottle cleaning machinery and including inclined delivery chutes, a combined gate and slide at the lower end of the chutes, and means controlled by the bottle cleaning machinery for automatically opening said combined gate and slide when a bottle holder of the bottle cleaning machinery is operatively positioned relative to said loader, and means controlled by the transferring means for automatically closing said combined gate and slide at the proper time.

8. In combination with a bottle cleaning machine having a receiving station and bottle holders successively brought to said receiving station, a loader comprising means for arranging the bottles so as to properly position them for automatic delivery to the bottle holders of the bottle cleaning machinery, and means for transferring the bottles so arranged to the bottle holders and including inclined chutes disposed at the receiving station and adapted to discharge into the bottle holders brought to the receiving station, a gate for regulating the discharge of the bottles from the chutes and means for automatically operating said gate at the proper times.

9. A loader for bottle cleaning machinery comprising a table on which the bottles are loaded, means for feeding the bottles along the table and forming them into rows, a bottle lifting shelf having dividing blocks between which the bottles are received, means for limiting the extent to which the bottles are moved on the shelf, means for raising and lowering the shelf, tiltable bottle pockets for receiving the bottles from the shelf in the raised position of the latter, means for tilting said bottle pockets, delivery means receiving the bottles from the pockets when the pockets are tilted and means for regulating the discharge of the bottles from the delivery means into the bottle cleaning machinery.

10. A loader for bottle cleaning machinery comprising means for arranging the bottles in row formation, means for transferring the bottles while in row formation to the bottle cleaning machinery and operating mechanism for said transferring means including a motion transmission element made up of relatively shiftable sections and yieldable means for normally latching said sections together, said yieldable means providing for relative movement of the sections and a suspension of transmission of the operating movement in the event elements of the transferring means encounter excessive resistance.

11. A loader for bottle cleaning machinery comprising a table on which the bottles are placed in an indiscriminate fashion and without regard to their arrangement, means for automatically selecting the proper number of bottles for the bottles of the bottle holding machinery and for arranging the bottles in the same relation to each other to which they are disposed in the bottle holders, and means for transferring the bottles so selected and arranged to the bottle holders of the bottle cleaning machinery, and operating mechanism for said transferring means including a motion transmission element made up of relatively shiftable members, a latch for releasably securing said members against shifting movement and yieldable means for biasing said latch to its operative position.

12. A loader for bottle cleaning machinery comprising a table on which the bottles are placed in an indiscriminate fashion and without regard to their arrangement, means for automatically selecting the proper number of bottles for the bottles of the bottle holding machinery and for arranging the bottles in the same relation to each other to which they are disposed in the bottle holders and means for transferring the bottles so selected and arranged to the bottle holders of the cleaning machinery, and operating mechanism for said transferring means including a motion transmission element made up of relatively shiftable members, a latch for releasably securing said members against shifting movement and yieldable means for biasing said latch to its operative position, and a control member for the drive of the machine interconnected with said motion transmission element so as to be thrown to position to shut off the drive of the machine upon relative movement of said members.

13. A loader for bottle cleaning machinery including a table, a conveyor for feeding bottles along the table, guides cooperating with the conveyor for arranging bottles placed on the table in row formation as they are fed therealong, a bottle lifting shelf for receiving rows of bottles from the table, shiftable bottle pockets positioned above said bottle lifting shelf, delivery chutes positioned to be alined with the bottles in their tilted position, cam operated means for raising and lowering said bottle lifting shelf, cam operated means for tilting said bottle pockets, a power drive for actuating said cam operating means and gearing between said power drive and said conveyor.

14. In combination with bottle cleaning machinery having a tank, bottle holders traveling through said tank and adapted to be brought to a receiving station, said bottle holders having compartments and having covers provided with rollers, a loader for said bottle cleaning machinery including means for arranging the bottles in row formation and means for transferring rows of the bottles to a bottle holder at the receiving station of the bottle cleaning machinery and including an inclined chute, a combined gate and slide at the lower end of the chute, latches for holding the gate closed, and a trip lever for said latches adapted to be actuated by the rollers of the covers of the bottle holders when a bottle holder is brought to the receiving station.

15. A loader for bottle cleaning machinery comprising a table on which the bottles are loaded, means for feeding bottles along the table and forming them into rows, a bottle lifting shelf, means for limiting the extent to which the bottles are moved on the shelf, means for raising and lowering the shelf, tiltable bottle pockets for receiving the bottles from the shelf in the raised position of the latter, means for tilting said bottle pockets, delivery means receiving the bottles from the pockets when the pockets are tilted and means for regulating the discharge of the bottles from the discharge means into the bottle cleaning machinery.

16. A loader for bottle cleaning machinery comprising a table on which the bottles are loaded, means for feeding the bottles along the table and forming them into rows, a bottle lifting shelf having dividing blocks between which the bottles are received, means for raising and lowering the shelf, tiltable bottle pockets for receiving the bottles from the shelf in the raised position of the latter, means for tilting said bottle pockets, delivery means receiving the bottles from the pockets when the pockets are tilted and means for regulating the discharge of the bottles from the delivery means into the bottle cleaning machinery.

17. A loader for bottle cleaning machinery comprising a table on which the bottles are loaded, means for feeding the bottles along the table and forming them into rows, a bottle lifting shelf, manually shiftable stop blocks for limiting the extent to which the bottles are moved on the said shelf, means for raising and lowering the shelf, tiltable bottle pockets for receiving the bottles from the shelf in the raised position of the latter, means for tilting said bottle pockets, delivery means receiving the bottles from the pockets when the pockets are tilted and means for regulating the discharge of the bottles from the delivery means into the bottle cleaning machinery.

18. A loader for bottle cleaning machinery having bottle holders and comprising a table on which bottles may be deposited from cases or the like and including longitudinally extending spaced strips, endless conveyors having horizontal runs extending between said strips, tapered guide members spaced from the loading end of the table, removably interconnected with and supported on said strips and cooperating with said endless conveyors for automatically arranging the bottles so as to properly position them for automatic delivery to the bottle holders of the bottle cleaning machinery and means for transferring the bottles so arranged to the bottle holders.

19. A loader for bottle cleaning machinery of the type having bottle holders or receivers and comprising a table on which the bottles may be loaded in an indiscriminate fashion and without regard to any particular arrangement, cooperating conveyors and guides associated with the table for feeding the bottles therealong and automatically so arranging them that they will be segregated into groups and properly positioned for automatic delivery to the bottle holders of the bottle cleaning machinery, and means for transferring each group of properly arranged bottles to the bottle holders of the bottle filling machinery, and including a bottle lifting shelf adapted in its lower position to receive a group of bottles from the table, tiltable bottle pockets designed to receive a group of bottles from the shelf when the shelf is raised and said pockets are vertically disposed, an inclined chute having an individual slideway for each bottle and adapted to receive the bottles from the pockets when the pockets are tilted and means at the discharge end of the chute for regulating the delivery of the bottles to the bottle holders of the bottle cleaning machinery.

20. A loader for bottle cleaning machinery of the type having bottle holders or receivers and comprising a table on which the bottles may be loaded in an indiscriminate fashion and without regard to any particular arrangement, cooperating conveyors and guides associated with the table for feeding the bottles therealong and automatically so arranging them that they will be segregated into groups and properly positioned for automatic delivery to the bottle holders of the bottle cleaning machinery, means for transferring each group of properly arranged bottles to the bottle holders of the bottle filling machinery, and including a bottle lifting shelf adapted in its lower position to receive a group of bottles from the table, tiltable bottle pockets designed to receive a group of bottles from the shelf when the shelf is raised and said pockets are vertically disposed, an inclined chute having an individual slideway for each bottle and adapted to receive the bottles from the pockets when the pockets are tilted, means at the discharge end of the chute for regulating the delivery of the bottles to the bottle holders of the bottle cleaning machinery and a stop plate interposed between the table and the bottle lifting shelf to preclude engagement between the bottles on the table and the shelf when the shelf is being raised and lowered.

21. A loader for bottle cleaning machinery comprising means for arranging the bottles in row formation, a vertically shiftable support to which the bottles are delivered row by row, means for raising and lowering said support, tiltable bottle pockets overlying the supports and receiving the bottles in the elevated position thereof, means for tilting the bottle pockets, and means receiving the bottles from the tilted bottle pockets and transferring them to the bottle cleaning machinery.

22. A loader for bottle cleaning machinery including a table on which the bottles are loaded, cooperating conveyors and guides for carrying the bottles along the table and effecting a predetermined transverse spacing of the bottle, a bottle lifting shelf arranged at the discharge end of the table and receiving the bottles from the conveyors, means for raising and lowering the shelf, tiltable bottle pockets receiving the bottles in the elevated position of the shelf, means for tilting the bottle pockets, means receiving the bottles from the bottle pockets when the latter are in tilted position and for transferring the bottles to the bottle cleaning machinery, and means interposed between the table and the bottle lifting shelf to prevent injurious engagement between the bottles on the table and the shelf when the shelf is being raised and lowered.

In witness whereof, I hereto affix my signature.

FRANK P. PERKINS.